(12) United States Patent
Muller et al.

(10) Patent No.: US 10,339,574 B2
(45) Date of Patent: Jul. 2, 2019

(54) SOFTWARE PROGRAM RATINGS

(71) Applicant: Apple Inc., Cupertino, CA (US)

(72) Inventors: Max Muller, San Jose, CA (US); Ricardo D. Cortes, Los Gatos, CA (US); Aloke Bhatnagar, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/132,134

(22) Filed: Apr. 18, 2016

(65) Prior Publication Data
US 2016/0307244 A1 Oct. 20, 2016

Related U.S. Application Data

(63) Continuation of application No. 12/171,171, filed on Jul. 10, 2008, now Pat. No. 9,342,287.

(51) Int. Cl.
*H04N 21/47* (2011.01)
*G06Q 30/02* (2012.01)
(Continued)

(52) U.S. Cl.
CPC ........... *G06Q 30/0282* (2013.01); *G06F 8/60* (2013.01); *G06F 16/248* (2019.01);
(Continued)

(58) Field of Classification Search
CPC ................ H04N 21/4756; G06Q 30/0282
See application file for complete search history.

(56) References Cited

U.S. PATENT DOCUMENTS 750,603 A 1/1904 Cloutier
4,750,119 A 6/1988 Cohen et al.
(Continued)

FOREIGN PATENT DOCUMENTS

EP WO2002/097620 12/2002
EP 1 684 223 A1 7/2006
(Continued)

OTHER PUBLICATIONS

Miller II, Stanley A., "All that iWish for on my iPhone," Wilwaukee, Wisconsin, Journal Sentinel, Mar. 16, 2008, downloaded from http://www.jsonline.com/business/29487929.html, pp. 1-4.
(Continued)

*Primary Examiner* — Robert W Beausoliel, Jr.
*Assistant Examiner* — Nirav K Khakhar
(74) *Attorney, Agent, or Firm* — Invoke

(57) ABSTRACT

Systems and methods here include computer-implemented methods for determining ratings for software including displaying multiple content descriptors and options for user selection of both the frequency and intensity of the content in the software program by non-numerical selections. Some embodiments include receiving selections of user characterizations of frequency and intensity for each of the multiple content descriptors, and mapping the user characterization selections of each of the multiple content descriptors to find a rating level for each of the multiple content descriptors. Some embodiments include determining a highest rating level for the software program by comparing all of the rating levels of all of the multiple content descriptors, and distributing the software program to certain geographies based on the determined highest rating level for the software program.

26 Claims, 8 Drawing Sheets

Related U.S. Application Data

(60) Provisional application No. 61/059,792, filed on Jun. 8, 2008, provisional application No. 61/059,790, filed on Jun. 8, 2008, provisional application No. 61/050,478, filed on May 5, 2008.

(51) Int. Cl.
    *G06F 16/248*     (2019.01)
    *G06F 16/2457*     (2019.01)
    *H04N 21/475*     (2011.01)
    *G06F 8/60*     (2018.01)
    *G06Q 30/06*     (2012.01)

(52) U.S. Cl.
    CPC ... *G06F 16/24578* (2019.01); *G06Q 30/0278* (2013.01); *G06Q 30/06* (2013.01); *H04N 21/4756* (2013.01)

(56) References Cited

U.S. PATENT DOCUMENTS

| | | |
|---|---|---|
| 5,253,165 A | 10/1993 | Leiseca et al. |
| 5,535,383 A | 7/1996 | Gower |
| 5,537,618 A | 7/1996 | Boulton et al. |
| 5,583,576 A | 12/1996 | Perlman et al. |
| 5,627,973 A | 5/1997 | Armstrong et al. |
| 5,752,128 A | 5/1998 | Yamashita |
| 5,765,152 A | 6/1998 | Erickson |
| 5,884,280 A | 3/1999 | Yoshioka et al. |
| 5,973,683 A | 10/1999 | Cragun et al. |
| 6,067,531 A | 5/2000 | Hoyt et al. |
| 6,085,253 A | 7/2000 | Blackwell et al. |
| 6,125,259 A | 9/2000 | Perlman |
| 6,151,643 A | 11/2000 | Cheng |
| 6,154,172 A * | 11/2000 | Piccionelli ......... G06F 17/3087 342/357.4 |
| 6,199,193 B1 | 3/2001 | Oyagi et al. |
| 6,226,618 B1 | 5/2001 | Downs et al. |
| 6,233,682 B1 | 5/2001 | Fritsch |
| 6,236,313 B1 | 5/2001 | Eskildsen et al. |
| 6,263,313 B1 | 7/2001 | Milsted |
| 6,275,954 B1 | 8/2001 | Herman et al. |
| 6,338,044 B1 | 1/2002 | Cook et al. |
| 6,341,353 B1 | 1/2002 | Herman et al. |
| 6,345,256 B1 | 2/2002 | Milsted et al. |
| 6,363,486 B1 | 3/2002 | Knapton |
| 6,381,742 B2 | 4/2002 | Forbes et al. |
| 6,385,596 B1 | 5/2002 | Wiser et al. |
| 6,389,592 B1 | 5/2002 | Ayres et al. |
| 6,546,555 B1 | 4/2003 | Hjelsvold et al. |
| 6,549,922 B1 | 4/2003 | Srivastava et al. |
| 6,587,837 B1 | 7/2003 | Spagna et al. |
| 6,591,420 B1 | 7/2003 | McPherson et al. |
| 6,658,476 B1 | 12/2003 | Van |
| 6,691,149 B1 | 2/2004 | Yokota et al. |
| 6,731,312 B2 | 5/2004 | Robbin |
| 6,754,895 B1 | 6/2004 | Bartel et al. |
| 6,873,992 B1 | 3/2005 | Thomas |
| 6,874,003 B2 | 3/2005 | Morohashi |
| 6,910,049 B2 | 6/2005 | Fenton et al. |
| 6,938,005 B2 | 8/2005 | Iverson et al. |
| 6,976,010 B2 | 12/2005 | Banerjee et al. |
| 7,073,193 B2 | 7/2006 | Marsh |
| 7,076,445 B1 | 7/2006 | Cartwright |
| 7,168,012 B2 | 1/2007 | Clauss et al. |
| 7,188,058 B2 | 3/2007 | Pelletier |
| 7,188,085 B2 | 3/2007 | Pelletier |
| 7,209,892 B1 | 4/2007 | Galuten et al. |
| 7,275,243 B2 | 9/2007 | Gibbons et al. |
| 7,292,980 B1 | 11/2007 | August et al. ............ 704/254 |
| 7,308,413 B1 | 12/2007 | Tota et al. |
| 7,328,049 B2 | 2/2008 | Chanut |
| 7,383,233 B1 | 6/2008 | Singh et al. |
| 7,624,046 B2 | 11/2009 | Galuten et al. |
| 7,653,552 B2 | 1/2010 | Vaidyanathan et al. |
| 7,685,512 B2 | 3/2010 | Hanson et al. |
| 7,729,946 B2 | 6/2010 | Chu |
| 7,739,256 B2 | 6/2010 | Powell ............ 707/705 |
| 7,756,920 B2 | 7/2010 | Muller et al. |
| 7,826,829 B2 | 11/2010 | Pousti |
| 7,827,162 B2 | 11/2010 | Suitts et al. |
| 7,835,720 B2 | 11/2010 | Pousti |
| 7,844,548 B2 | 11/2010 | Robbin et al. |
| 7,860,830 B2 | 12/2010 | Mirrashidi et al. |
| 7,962,634 B2 | 6/2011 | Cortes et al. |
| 8,015,237 B2 | 9/2011 | Muller et al. |
| 2001/0021926 A1 | 9/2001 | Schneck et al. |
| 2001/0037207 A1 | 11/2001 | Dejaeger |
| 2001/0044786 A1 | 11/2001 | Ishibashi |
| 2001/0054046 A1 | 12/2001 | Mikhailov et al. |
| 2002/0002541 A1 | 1/2002 | Williams |
| 2002/0032658 A1 | 3/2002 | Oki et al. |
| 2002/0047899 A1 | 4/2002 | Son et al. |
| 2002/0049844 A1 | 4/2002 | Nishikawa |
| 2002/0059110 A1 | 5/2002 | Yamamoto et al. |
| 2002/0073177 A1 | 6/2002 | Clark et al. |
| 2002/0077986 A1 | 6/2002 | Kobata et al. |
| 2002/0078211 A1 | 6/2002 | Natarajan et al. |
| 2002/0082857 A1 | 6/2002 | Skordin et al. |
| 2002/0087440 A1 | 7/2002 | Blair et al. |
| 2002/0091584 A1 | 7/2002 | Clark et al. |
| 2002/0099661 A1 | 7/2002 | Kii et al. |
| 2002/0099696 A1 | 7/2002 | Prince |
| 2002/0099801 A1 | 7/2002 | Ishii |
| 2002/0107795 A1 | 8/2002 | Minear et al. |
| 2002/0107803 A1 | 8/2002 | Lisanke et al. |
| 2002/0112171 A1 | 8/2002 | Ginter et al. |
| 2002/0116293 A1 | 8/2002 | Lao et al. |
| 2002/0124182 A1 | 9/2002 | Bacso et al. |
| 2002/0143612 A1 | 10/2002 | Barik et al. |
| 2002/0143782 A1 | 10/2002 | Headings et al. |
| 2002/0152267 A1 | 10/2002 | Lennon |
| 2002/0152278 A1 | 10/2002 | Pontenzone et al. |
| 2002/0165811 A1 | 11/2002 | Ishii et al. |
| 2002/0186844 A1 | 12/2002 | Levy et al. |
| 2002/0198843 A1 | 12/2002 | Wang et al. |
| 2003/0005173 A1 | 1/2003 | Shah et al. |
| 2003/0037242 A1 | 2/2003 | Yasuna et al. |
| 2003/0065717 A1 | 4/2003 | Saito et al. |
| 2003/0074465 A1 | 4/2003 | Tang et al. |
| 2003/0093790 A1 | 5/2003 | Logan et al. |
| 2003/0115144 A1 | 6/2003 | Stefik et al. |
| 2003/0120593 A1 | 6/2003 | Bansai et al. |
| 2003/0120928 A1 | 6/2003 | Cato et al. |
| 2003/0135424 A1 | 7/2003 | Davis et al. |
| 2003/0149742 A1 | 8/2003 | Bollerud |
| 2003/0182188 A1 | 9/2003 | Duchow |
| 2003/0225701 A1 | 12/2003 | Lee et al. |
| 2003/0236886 A1 | 12/2003 | Oren et al. |
| 2004/0012618 A1 | 1/2004 | Finney |
| 2004/0015427 A1 | 1/2004 | Camelio |
| 2004/0015445 A1 | 1/2004 | Heaven et al. |
| 2004/0034601 A1 | 2/2004 | Kreuzer |
| 2004/0039754 A1 | 2/2004 | Harple, Jr. ............ 707/104.1 |
| 2004/0043753 A1 | 3/2004 | Wake et al. |
| 2004/0044949 A1 | 3/2004 | Rowe |
| 2004/0059929 A1 | 3/2004 | Rodgers et al. |
| 2004/0133605 A1 | 7/2004 | Chang et al. |
| 2004/0136698 A1 | 7/2004 | Mock et al. |
| 2004/0143760 A1 | 7/2004 | Alkove et al. |
| 2004/0148598 A1 | 7/2004 | Kita et al. |
| 2004/0153968 A1 | 8/2004 | Ching et al. |
| 2004/0158546 A1 | 8/2004 | Sobel et al. |
| 2004/0162831 A1* | 8/2004 | Patterson ......... G06F 17/30011 |
| 2004/0167858 A1 | 8/2004 | Erickson |
| 2004/0181459 A1 | 9/2004 | Wright |
| 2004/0181591 A1 | 9/2004 | Yu et al. |
| 2004/0205028 A1 | 10/2004 | Verosub et al. |
| 2004/0210481 A1 | 10/2004 | Quinlan et al. |
| 2004/0215733 A1 | 10/2004 | Gondhalekar et al. |
| 2004/0254883 A1 | 12/2004 | Kondrk et al. |
| 2004/0254949 A1 | 12/2004 | Amirthalingam |
| 2004/0267552 A1 | 12/2004 | Gilliam et al. |
| 2004/0267608 A1 | 12/2004 | Mansfield, Jr. |

(56) References Cited

U.S. PATENT DOCUMENTS

| | | |
|---|---|---|
| 2004/0268451 A1 | 12/2004 | Robbin et al. |
| 2005/0015765 A1 | 1/2005 | Covell et al. |
| 2005/0021478 A1 | 1/2005 | Gautier et al. |
| 2005/0033774 A1 | 2/2005 | Brentano et al. |
| 2005/0034164 A1 | 2/2005 | Sano et al. |
| 2005/0038813 A1 | 2/2005 | Apparao et al. |
| 2005/0050218 A1 | 3/2005 | Sheldon et al. |
| 2005/0050345 A1 | 3/2005 | Dowdy et al. |
| 2005/0080743 A1 | 4/2005 | Ostrover et al. |
| 2005/0080788 A1 | 4/2005 | Murata |
| 2005/0081043 A1* | 4/2005 | Evans .................. H04N 7/162 713/182 |
| 2005/0132042 A1* | 6/2005 | Cryer ................ H04L 63/0227 709/224 |
| 2005/0144635 A1 | 6/2005 | Boortz |
| 2005/0165656 A1 | 7/2005 | Frederick et al. ............. 705/25 |
| 2005/0182792 A1 | 8/2005 | Israel et al. |
| 2005/0197945 A1 | 9/2005 | Williams et al. .............. 705/35 |
| 2005/0216457 A1 | 9/2005 | Walther et al. |
| 2005/0216472 A1 | 9/2005 | Leon et al. |
| 2005/0240529 A1 | 10/2005 | Thomas |
| 2005/0240966 A1* | 10/2005 | Hindle .............. H04N 21/2358 725/45 |
| 2005/0246740 A1 | 11/2005 | Teraci et al. |
| 2005/0267894 A1 | 12/2005 | Carnahan |
| 2005/0278375 A1 | 12/2005 | Mitchko et al. |
| 2005/0283394 A1 | 12/2005 | McGloin et al. |
| 2005/0289047 A1 | 12/2005 | Oliver et al. |
| 2006/0008256 A1 | 1/2006 | Khedouri et al. |
| 2006/0015463 A1 | 1/2006 | Gupta et al. ................... 705/52 |
| 2006/0015489 A1 | 1/2006 | Probst et al. |
| 2006/0041748 A1 | 2/2006 | Lockhart et al. |
| 2006/0048132 A1 | 3/2006 | Chen et al. |
| 2006/0062426 A1 | 3/2006 | Levy et al. |
| 2006/0074754 A1 | 4/2006 | Toyohara et al. .............. 705/14 |
| 2006/0107046 A1 | 5/2006 | Raley et al. |
| 2006/0112101 A1 | 5/2006 | Young |
| 2006/0143264 A1 | 6/2006 | Payne et al. .................. 709/203 |
| 2006/0161604 A1 | 7/2006 | Lobo |
| 2006/0167751 A1 | 7/2006 | Maruyama |
| 2006/0167816 A1 | 7/2006 | Wang et al. |
| 2006/0212722 A1 | 9/2006 | Ginter et al. |
| 2006/0229929 A1 | 10/2006 | Hughes ............................ 705/9 |
| 2006/0242640 A1 | 10/2006 | Pauly et al. .................... 717/174 |
| 2006/0272026 A1 | 11/2006 | Niwano et al. |
| 2006/0277096 A1 | 12/2006 | Levitus |
| 2006/0287966 A1 | 12/2006 | Srinivasaraghavan et al. |
| 2007/0011156 A1 | 1/2007 | Maron |
| 2007/0011178 A1 | 1/2007 | Dumitru et al. |
| 2007/0011709 A1 | 1/2007 | Katz et al. |
| 2007/0028269 A1 | 2/2007 | Nezu et al. |
| 2007/0033531 A1 | 2/2007 | Marsh |
| 2007/0038931 A1 | 2/2007 | Allaire et al. |
| 2007/0050467 A1 | 3/2007 | Borrett et al. ................. 709/213 |
| 2007/0073596 A1 | 3/2007 | Alexander et al. |
| 2007/0073694 A1 | 3/2007 | Picault et al. |
| 2007/0083471 A1 | 4/2007 | Robbin et al. |
| 2007/0106522 A1 | 5/2007 | Collins |
| 2007/0108274 A1 | 5/2007 | Boardman et al. |
| 2007/0133609 A1 | 6/2007 | Moore et al. |
| 2007/0180490 A1 | 8/2007 | Renzi et al. |
| 2007/0192352 A1 | 8/2007 | Levy |
| 2007/0208670 A1 | 9/2007 | Quoc |
| 2007/0208718 A1 | 9/2007 | Javid et al. |
| 2007/0220051 A1 | 9/2007 | Brentano et al. ......... 707/104.1 |
| 2007/0233604 A1 | 10/2007 | Larson et al. |
| 2007/0256093 A1 | 11/2007 | Hiler |
| 2007/0260603 A1 | 11/2007 | Tuscano et al. |
| 2007/0261088 A1 | 11/2007 | Phillips et al. |
| 2007/0265969 A1 | 11/2007 | Horwat et al. |
| 2007/0266028 A1 | 11/2007 | Muller et al. |
| 2007/0266047 A1 | 11/2007 | Cortes et al. |
| 2007/0294089 A1 | 12/2007 | Garbow et al. |
| 2008/0040379 A1 | 2/2008 | Suitts et al. |
| 2008/0040748 A1* | 2/2008 | Miyaki ................ G11B 27/036 725/46 |
| 2008/0071614 A1 | 3/2008 | Mebruer |
| 2008/0120199 A1 | 5/2008 | Pirnack et al. |
| 2008/0133594 A1 | 6/2008 | Fotinatos et al. .......... 707/104.1 |
| 2008/0140493 A1 | 6/2008 | DeAngelis |
| 2008/0140537 A1 | 6/2008 | Powell ........................... 705/26 |
| 2008/0147530 A1 | 6/2008 | Kwan et al. |
| 2008/0147558 A1 | 6/2008 | Kraus |
| 2008/0155552 A1 | 6/2008 | Kim |
| 2008/0163379 A1* | 7/2008 | Robinson ........... G06Q 30/0222 726/27 |
| 2008/0195651 A1 | 8/2008 | Rachmiel et al. |
| 2008/0233918 A1 | 9/2008 | Pousti |
| 2008/0249946 A1 | 10/2008 | Candelore |
| 2008/0288405 A1 | 11/2008 | John |
| 2008/0301058 A1 | 12/2008 | Campbell et al. .............. 705/80 |
| 2008/0320568 A1 | 12/2008 | Hawkins et al. |
| 2009/0037287 A1 | 2/2009 | Baitalmal et al. |
| 2009/0063543 A1 | 3/2009 | Martin et al. |
| 2009/0138117 A1 | 5/2009 | Bagwell et al. |
| 2009/0198830 A1 | 8/2009 | Zhang et al. |
| 2009/0240552 A1 | 9/2009 | Yang et al. ....................... 705/9 |
| 2009/0259502 A1 | 10/2009 | Erlewine et al. |
| 2009/0260060 A1 | 10/2009 | Smith et al. |
| 2009/0265731 A1 | 10/2009 | Eyer et al. |
| 2009/0276332 A1 | 11/2009 | Gharabally et al. |
| 2009/0276333 A1 | 11/2009 | Cortes et al. |
| 2009/0276433 A1 | 11/2009 | Fosback et al. |
| 2009/0282438 A1* | 11/2009 | White .................... G06Q 30/02 725/44 |
| 2009/0307201 A1 | 12/2009 | Dunning et al. |
| 2009/0307682 A1 | 12/2009 | Gharabally |
| 2009/0307683 A1 | 12/2009 | Gharabally |
| 2010/0011336 A1 | 1/2010 | Muller et al. |
| 2010/0011392 A1 | 1/2010 | Bronstein et al. |
| 2010/0060776 A1 | 3/2010 | Topliss et al. |
| 2010/0115443 A1 | 5/2010 | Richstein |
| 2010/0205274 A1 | 8/2010 | Gharabally et al. |
| 2010/0235254 A1 | 9/2010 | Chu et al. |
| 2010/0235889 A1 | 9/2010 | Chu et al. |
| 2010/0251099 A1 | 9/2010 | Makower et al. |
| 2010/0299219 A1 | 11/2010 | Cortes et al. |
| 2011/0023001 A1 | 1/2011 | Giffel |
| 2011/0035579 A1 | 2/2011 | Miura et al. |
| 2013/0185291 A1 | 7/2013 | Tyndall |

FOREIGN PATENT DOCUMENTS

| | | |
|---|---|---|
| EP | 2 230 620 A1 | 9/2010 |
| JP | 2003036396 A | 7/2001 |
| JP | 2003241845 A | 2/2002 |
| JP | 2003333198 A | 5/2002 |
| JP | 2004171360 A | 8/2004 |
| KR | 10-2007-0000739 | 1/2007 |
| KR | 10-2008-0009589 | 1/2007 |
| WO | WO 97/04410 | 2/1997 |
| WO | WO 98/49644 | 11/1998 |
| WO | WO 00/08909 | 2/2000 |
| WO | WO 02/48920 | 6/2002 |
| WO | WO 2004/019182 A2 | 3/2004 |

OTHER PUBLICATIONS

Cortes, Ricardo D. et al., "Electronic Submission and Management of Digital Products for Network-Based Distribution", 8802.318. PCKR01 Second Preliminary Rejection, Application No. 2012-7022159, Filed May 5, 2009, dated Aug. 29, 2013., Sep. 13, 2012, 41 pages.

Fosback, Jason R. et al., "Electronic Submission of Application Programs for Network-Based Distribution", 8802.317.PCCA00 Examination report, Application No. 2723373, Filed May 5, 2009, dated Mar. 26, 2013, pp. 1-4.

Fosback, Jason R. et al., "Electronic Submission of Application Programs for Network-Based Distribution", 8802.317.PCCN00, Second Office Action, Application No. 200980123614.6, Filed May 5, 2009, dated Apr. 28, 2013, pp. 1-34.

(56) References Cited

OTHER PUBLICATIONS

"Media encoding datasheet," Loudeye Corp., http://www.loudeye.com/digitalmedia/solutions/mediaenchost/encoding.asp, downloaded Oct. 9, 2003, pp. 1-4.

"Media hosting datasheet," Loudeye Corp. http://www.loudeye.com/digitalmedia/solutions/mediaenchost/hosting.asp, downloaded Oct. 9, 2003, pp. 1-2.

Examiner's First Report for Australian Patent Application No. 2009244432, dated Sep. 23, 2011.

"Liquifier Pro 4.0 for Windows™ User's Guide," 1998, Liquid Audio, Inc.

Radified Guide to Ripping & Encoding CD Audio, http://mp3.radified.com, downloaded Oct. 7, 2003, pp. 1-5.

"Music Collector Features," Collectorz.com music collector features, http://www.collectorz.com/music/features.php, downloaded Oct. 7, 2003, pp. 1-2.

"Gracenote CDDB," Gracenote, product webpage, http://www.gracenote.com/gn_products/cddb.html, downloaded Oct. 7, 2003, pp. 1-2.

"Gracenote MusicID," Gracenote, product webpage, http://www.gracenote.com/gn_products/music_id.html, downloaded Oct. 7, 2003, pp. 1-2.

"AVCataloger Overview," NC Software, Inc. http://www.avcataloger.com/Products.aspx, downloaded Oct. 6, 2003, pp. 1-4.

Jyri Huopaniemi, "Music Encoding and Transmission," CUIDAD meeting, ICMC '2000 Berlin, Aug. 28, 2000.

"Media Encoding FAQ," Loudeye Corp., http://www.loudeye.com/digitalmedia/solution/mediaenchost/encodingfaw.asp, downloaded Oct. 9, 2003, pp. 1-3.

"Preview and Convera Announce Availability of Digital Media Commerce Platform for Secure Digital Audio Devices," Convera Press release, Las Vegas, NV, Consumer Electronics Show, Jan. 8, 2001, pp. 1-3.

Sonopress Global Network User Manual, Client Tools, Upload Data/Graphics Files to Sonopress, Sonopress, date unknown.

MPEG-7 Multimedia Description Schemes XM (Version 2.0), ISO/IEC, Mar. 2000, pp. 1-138.

"Digital Audio Best Practices Version 2.1", by Digital Audio Working Group, Oct. 2006, http:/www.mndigital.org.digitizing/standards/audio.pdf.

Information Week. "Apple Plans Tight Control of iPhone App Distribution; With the exception of custom applications built by businesses solely for the use of iPhone-carrying workers, all software built will filter through Apple's App Store" [online] Mar. 7, 2008.

Lei-da Chen et al., "Enticing online consumers: an extended technology acceptance perspective", Information & Management 39 (2002) 705-719.

Information Week. "Apple Plans Tight Control of iPhone App Distribution; With the exception of custom applications built by businesses solely for the use of iPhone-carrying workers, all software built will filter through Apple's App Store" [online] Mar. 7, 2008. [retrieved on Nov. 2, 2013] Retrieved from ProQuest <URL: http://search.proquest.com/prof essional/docview/1060926438?accountid= 157282#> entire document.

"Ratings Process", Entertainment Software Rating Board, downloaded Jul. 1, 2008.

"Gaming Ratings & Descriptor Guide", Entertainment Software Rating Board, downloaded Jul. 1, 2008.

* cited by examiner

200

| Content Descriptors | None | Infrequent/Mild | Frequent/Intense |
|---|---|---|---|
| Cartoon or Fantasy Violence | ● | ○ | ○ |
| Realistic Violence | ● | ○ | ○ |
| Sexual Conduct or Nudity | ● | ○ | ○ |
| Profanity or Crude Humor | ● | ○ | ○ |
| Alcohol, Tobacco, or Drug Use or References | ● | ○ | ○ |
| Mature/Suggestive Themes | ● | ○ | ○ |
| Simulated Gambling | ○ | ○ | ● |
| Horror/Fear Themes | ● | ○ | ○ |
| Prolonged graphic or sadistic realistic violence | ● | ○ | ○ |
| Graphical sexual content and nudity | ● | ○ | ○ |

FIG. 2A

SOFTWARE PROGRAM RATINGS

CROSS-REFERENCE TO OTHER APPLICATIONS

This application claims priority to and is a continuation of U.S. patent application Ser. No. 12/171,171 filed Jul. 10, 2008 entitled SOFTWARE PROGRAM RATINGS, which is hereby incorporated herein by reference; which in turn claims priority to: (i) U.S. Provisional Patent Application No. 61/050,478, filed May 5, 2008, entitled ELECTRONIC SUBMISSION AND MANAGEMENT OF DIGITAL PRODUCTS FOR NETWORK-BASED DISTRIBUTION, which is hereby incorporated herein by reference; (ii) U.S. Provisional Patent Application No. 61/059,792, filed Jun. 8, 2008, entitled ELECTRONIC SUBMISSION OF APPLICATION PROGRAMS FOR NETWORK-BASED DISTRIBUTION, which is hereby incorporated herein by reference; and (iii) U.S. Provisional Patent Application No. 61/059,790, filed Jun. 8, 2008, entitled NETWORK-BASED DISTRIBUTION OF APPLICATION PRODUCTS, which are hereby incorporated herein by reference.

BACKGROUND

Field of the Invention

The present disclosure relates to updates for software programs and, more particularly, to ratings for software programs.

Description of the Related Art

Software programs are commonly available for purchase (or license) at brick-and-mortar stores as well as online stores. A software program is often purchased as a compact disc (CD) or digital versatile disk (DVD) containing the software program. Alternatively, purchasers can purchase and download a software program from an online retailer or software provider's website.

Like movie ratings, software games can be rated. The ratings provide potential purchasers with information on suitability of software games to different age groups. The rating for a software game can be determined by an independent rating board. One known rating board is the Entertainment Software Rating Board (ESRB) which rates software games for game publishers. Examples of ratings used by ESRB include: EC (Early Childhood), E (Everyone), E10+ (Everyone 10 and older), T (Teen), M (Mature), and AD (Adults Only).

To obtain a rating from the ESRB, a game publisher submits a written ESRB questionnaire specifying pertinent content within the software game. Additionally, the game publisher must submit a videotape or DVD which captures all pertinent content, including the most extreme instances, across all relevant categories including but not limited to violence, language, sex, controlled substances and gambling. ESRB then determines a rating for the software game and so informs the game publisher. The game publisher, if unsatisfied, can appeal the rating to an appeal board or revise the game and resubmit the revised game for a rating.

Unfortunately, however, it is costly and time consuming to obtain a rating from a rating board. While a rating board is a useful option for larger game publishers, the costs and delays associated with obtaining a rating from a rating board are burdensome on small game publishers. Moreover, for world-wide distribution of a software game, game publishers need to obtain and utilize ratings from various different rating boards, which can be burdensome on all game publishers.

Accordingly, there is a need for improved approaches to rating software programs.

SUMMARY OF THE INVENTION

The invention pertains to rating a software program. The rating can be automatically determined from a plurality of user characterizations. The user characterizations can be designated by a user (e.g., developer or publisher) with respect to a plurality of content descriptors. The user characterizations can be supplied by the user on submitting a software program to an online distribution system. Once a rating is determined and associated with a software program, the rating can be used to influence availability of the software program from an online distribution system. The rating (or how the rating influences availability) can be dependent on geographical region. The rating being determined can also be influenced by rating rules.

The invention can be implemented in numerous ways, including as a method, system, device, apparatus (including computer readable medium and graphical user interface). Several embodiments of the invention are discussed below.

As a computer-implemented method for determining a rating for a software program, one embodiment of the invention can, for example, include at least: displaying a plurality of content descriptors; receiving a user characterization for each of the content descriptors with respect to the software program; and determining a rating for the software program based on the user characterizations.

As a method for distributing a software program from an online repository, one embodiment of the invention can, for example, include at least: receiving product information pertaining to a software program; receiving characterizations of content descriptors with respect to the software program; receiving at least one electronic file pertaining to the software program; receiving at least one distribution parameter to be used for the software program; and storing the at least one electronic file pertaining to the software program to the online repository for distribution.

As a method for submitting a software product to an online repository for distribution, one embodiment of the invention can, for example, include at least: receiving product information pertaining to a software product to be submitted to the online repository; receiving characterizations of content descriptors with respect to the software product; uploading at least one electronic file pertaining to the software product; receiving at least one distribution parameter to be used for the software product; and submitting the software product to the online repository for distribution.

As a system for facilitating submission and management of digital products to be distributed online, one embodiment of the invention can, for example, include at least: a product management and distribution system configured to permit digital product providers to submit digital products and manage distribution of their digital products. The product management and distribution system can include at least a product submission module configured to receive submission of new digital products for distribution, where each of the new digital products being submitted can provide at least product information and product content characterization information. The product content characterization information can include at least characterizations of a plurality of content descriptors with respect to the corresponding digital product.

As a computer readable medium including at least computer program code for determining a rating for a software program, one embodiment of the invention can, for example, include at least: computer program code for displaying a plurality of content descriptors; computer program code for receiving a user characterization for each of the content descriptors with respect to the software program; and computer program code for determining a rating for the software program based on the user characterizations.

Other aspects of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which:

FIG. 2A is exemplary graphical user interface according to one embodiment on the invention.

DETAILED DESCRIPTION OF THE INVENTION

The invention pertains to rating a software program. The rating can be automatically determined from a plurality of user characterizations. The user characterizations can be designated by a user (e.g., developer or publisher) with respect to a plurality of content descriptors. The user characterizations can be supplied by the user on submitting a software program to an online distribution system. Once a rating is determined and associated with a software program, the rating can be used to influence availability of the software program from an online distribution system. The rating (or how the rating influences availability) can be dependent on geographical region. The rating being determined can also be influenced by rating rules.

Embodiments of the invention are discussed below with reference to FIGS. 1-6. However, those skilled in the art will readily appreciate that the detailed description given herein with respect to these figures is for explanatory purposes as the invention extends beyond these limited embodiments.

Figure 1:
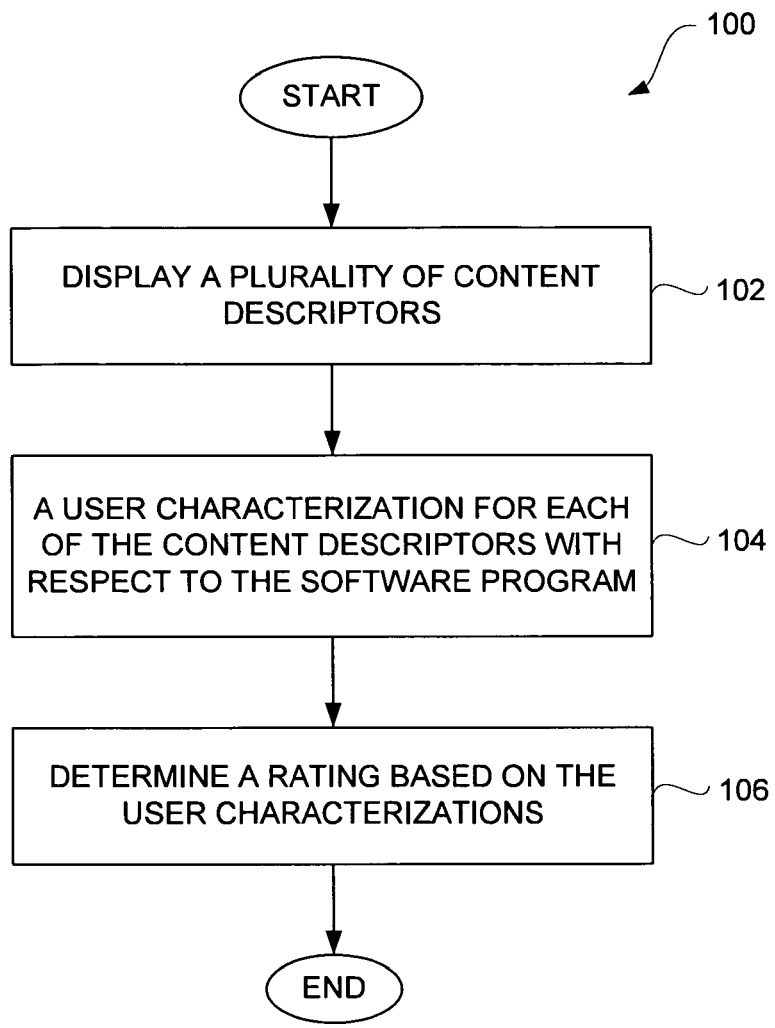
FIG. 1 is a flow diagram of a raring process according to one embodiment of the invention.

FIG. 1 is a flow diagram of a rating process 100 according to one embodiment of the invention. The rating process 100 is performed by a computing device, such as a client device or a server device.

The rating process 100 can display 102 a plurality of content descriptors. The content descriptors pertain to a plurality of descriptive categories that pertained to a digital product. As an example, the digital product can be a software program. The software program is a computer program that can be executed on a computing device. The computing device can be a handheld, portable, desktop or rack-mounted computing device. The rating process 100 can then receive 104 a user characterization for each of the content descriptors with respect to the software program. In one implementation, a user can inform the computing device of their characterization of each of the content descriptors being displayed 102. Thereafter, a rating can be determined 106 based on the user characterizations. Following the block 106, the rating process 100 can end.

In one embodiment, a user can provide user characterizations of a plurality of different content descriptors using a graphical user interface presented on a display associated with the computing device. The graphical user interface can include user interface controls that assist the user in providing the user characterizations. In one embodiment, the graphical user interface can have a table arrangement. The table arrangement can have a plurality of rows, where each row pertains to one of the content descriptors. The table arrangement can also have a plurality of columns, where each column contains separate characterizations for such content descriptors. In one embodiment, the characterizations can be selected from predetermined characterization options. Hence, the user can interact with the graphical user interface to select one of the predetermined characterization options for each of the corresponding content descriptor.

FIG. 2A is exemplary graphical user interface 200 according to one embodiment on the invention. The exemplary graphical user interface 200 includes a row-column configuration with content descriptors listed along the rows and with selectable user characterizations listed along the columns. In the exemplary graphical user interface 200 illustrated in FIG. 2A, the content descriptors displayed in the rows include: Cartoon or Fantasy Violence; Realistic Violence; Sexual Conduct or Nudity; Profanity or Crude Humor; Alcohol, Tobacco, or Drug Use or References; Mature/Suggestive Themes; Simulated Gambling; Horror/Fear Themes; Prolonged graphic or sadistic realistic violence; and Graphical sexual content and nudity. Also, the selectable user characterizations in the columns can pertain to a level of frequency or intensity. More particularly, the selectable user characterizations in the exemplary graphical user interface 200 illustrated in FIG. 2A include: None, Infrequent/Mild, Frequent/Intense.

Figure 2B:
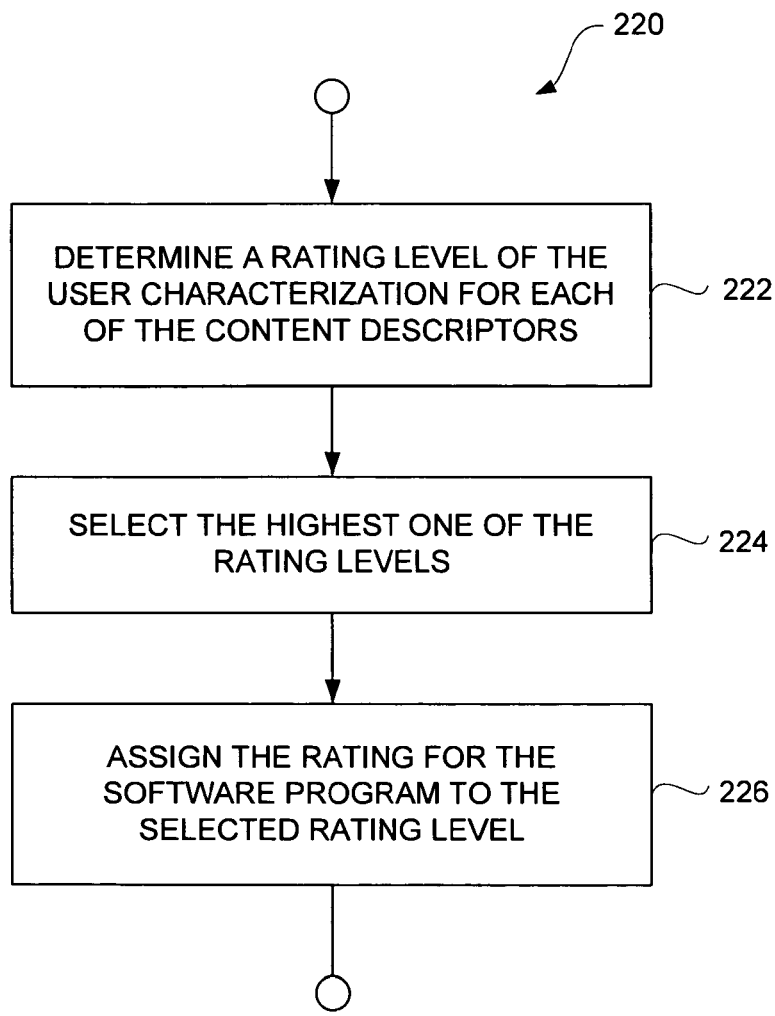
FIG. 2B is a flow diagram of a rating determination process according to one embodiment of the invention.

FIG. 2B is a flow diagram of a rating determination process 220 according to one embodiment of the invention. The rating determination process 220 can, for example, pertain to rating determination processing performed by the block 106 of the rating process 100 illustrated in FIG. 1. In the rating determination process 220, a rating level of the user characterization for each of the content descriptors can be determined 222. The highest one of the rating levels can then be selected 224. Thereafter, the rating for the software program can be assigned 226 to the selected rating level. Following the assignment 226 of the rating, the rating determination process 220 can end.

In one embodiment, rating levels can be determined in accordance with the following Table I for the user characterizations of each of a plurality of content descriptors.

TABLE I

| Content Descriptors | Infrequent/Mild | Frequent/Intense |
|---|---|---|
| Cartoon or Fantasy Violence | 9+ | 9+ |
| Realistic Violence | 9+ | 12+ |
| Sexual Conduct or Nudity | 12+ | 17+ |
| Profanity or Crude Humor | 9+ | 12+ |

TABLE I-continued

| Content Descriptors | Infrequent/Mild | Frequent/Intense |
|---|---|---|
| Alcohol, Tobacco, or Drug Use or References | 12+ | 17+ |
| Mature/Suggestive Themes | 9+ | 17+ |
| Simulated Gambling | 12+ | 17+ |
| Horror/Fear Themes | 9+ | 12+ |
| Prolonged graphic or sadistic realistic violence | Adult Only | Adult Only |
| Graphical sexual content and nudity | Adult Only | Adult Only |

For example, with respect to the ten (10) different content descriptors illustrated in FIG. 2A, the user characterizations indicated by the user for a particular software application might be respectively assigned to the following user characterizations as provided in Table II.

TABLE II

| Content Descriptors | None | Infrequent/Mild | Frequent/Intense |
|---|---|---|---|
| Cartoon or Fantasy Violence | ● | ○ | ○ |
| Realistic Violence | ● | ○ | ○ |
| Sexual Conduct or Nudity | ● | ○ | ○ |
| Profanity or Crude Humor | ● | ○ | ○ |
| Alcohol, Tobacco, or Drug Use or References | ● | ○ | ○ |
| Mature/Suggestive Themes | ○ | ● | ○ |
| Simulated Gambling | ○ | ○ | ● |
| Horror/Fear Themes | ● | ○ | ○ |
| Prolonged graphic or sadistic realistic violence | ● | ○ | ○ |
| Graphical sexual content and nudity | ● | ○ | ○ |

As indicated in Table II, the content descriptor for "Mature/Suggestive Themes" has a user characterization of "Infrequent/Mild", and the content descriptor for "Simulating Gambling" has a user characterization of "Frequent/Intense". These user characterizations then respectively correlate to rating levels of 9+ and 17+, as provided in Table I. Of these rating levels, the rating level of 17+ is the highest of the rating levels. The rating for the software program can then be assigned to the highest rating level. Hence, in this example, the rating for the software program is 17+. Here, in this representative example, the rating for the software program is exclusively determined from the user characterizations.

As noted above, a rating for a software program can be exclusively determined from user characterizations. However, a rating for a software program can alternatively or additionally be determined by a rating rule. A rating rule can also be referred to as a policy rule since a policy can be set to impose a rule used in determining a rating.

Figure 2C:
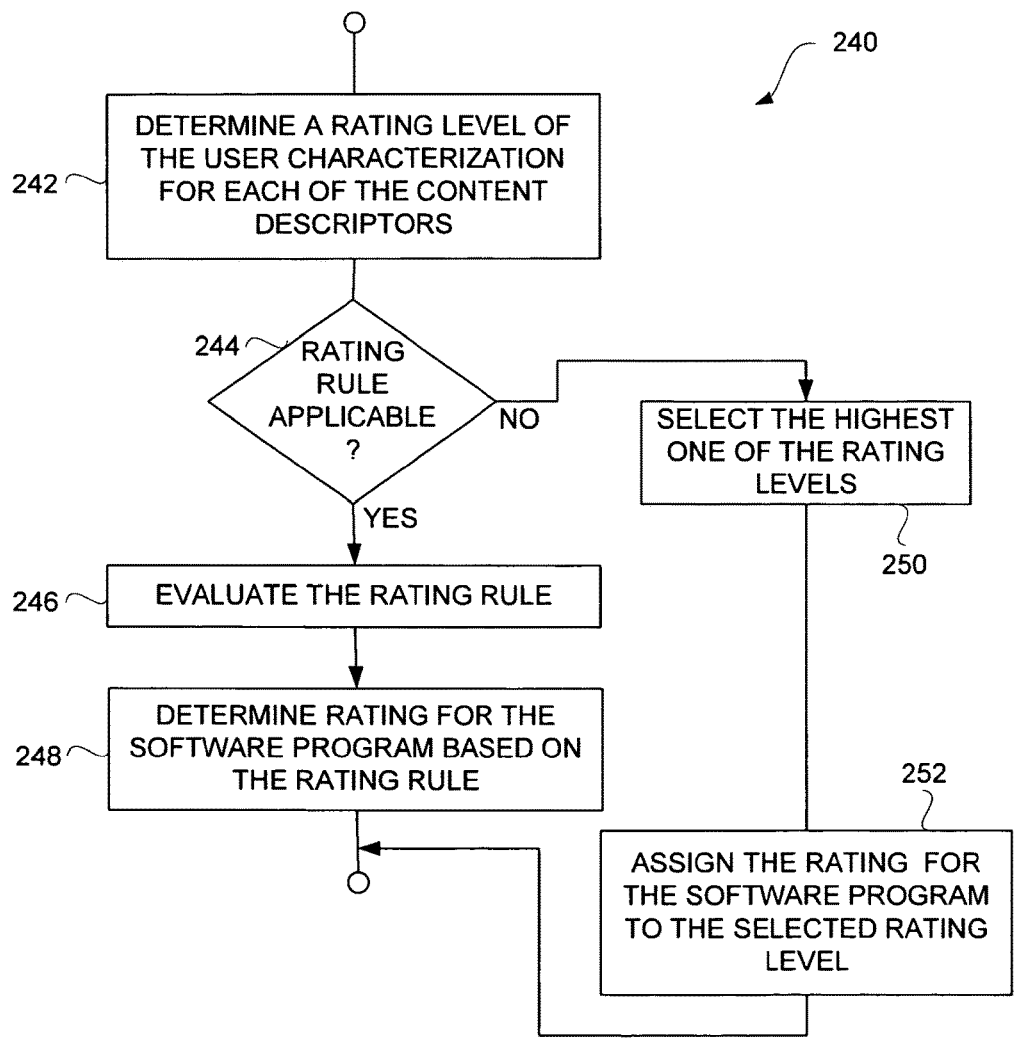
FIG. 2C is a flow diagram of a rating determination process according to another embodiment of the invention.

FIG. 2C is a flow diagram of a rating determination process 240 according to one embodiment of the invention. The rating determination process 240 can, for example, pertain to processing performed by the block 106 of the rating process 100 illustrated in FIG. 1.

The rating determination process 240 can determine 242 a rating level of the user characterization for each of the content descriptors. A decision 244 can then determine whether a rating rule is applicable. In this embodiment, the rating determination process 240 can make use of one or more rating rules to determine a rating (or impact the determination of the rating) to be applied to a software program. In one embodiment, the rating rules are dependent upon the user characterizations. For example, a rating rule could state that if user characterizations indicate high levels of three different content descriptors (of undesired characteristics) pertaining to undesired content of the software program, then a rating can be set to an Adult Only rating. The Adult Only rating can cause the associated software application to be unavailable for distribution. More generally, when the decision 244 determines that a rating rule is applicable, the rating rule can be evaluated 246. In one implementation, the rating rule is a rule that determines a rating based on a rating level of one or more user characterizations for one or more of the content descriptors. After the rating rule has been evaluate 246, a rating for the software program can be determined 248 based on the rating rule.

On the other hand, when the decision 244 determines that a rating rule is not applicable, the highest one of the rating levels determined 242 by the user for each of the user characterizations can be selected 250. After the highest one of the rating levels is selected 250, the rating for the software program can be assigned 252 to the selected rating level. Following the block 248 or 252, the rating determination process 240 can end.

Figure 3:
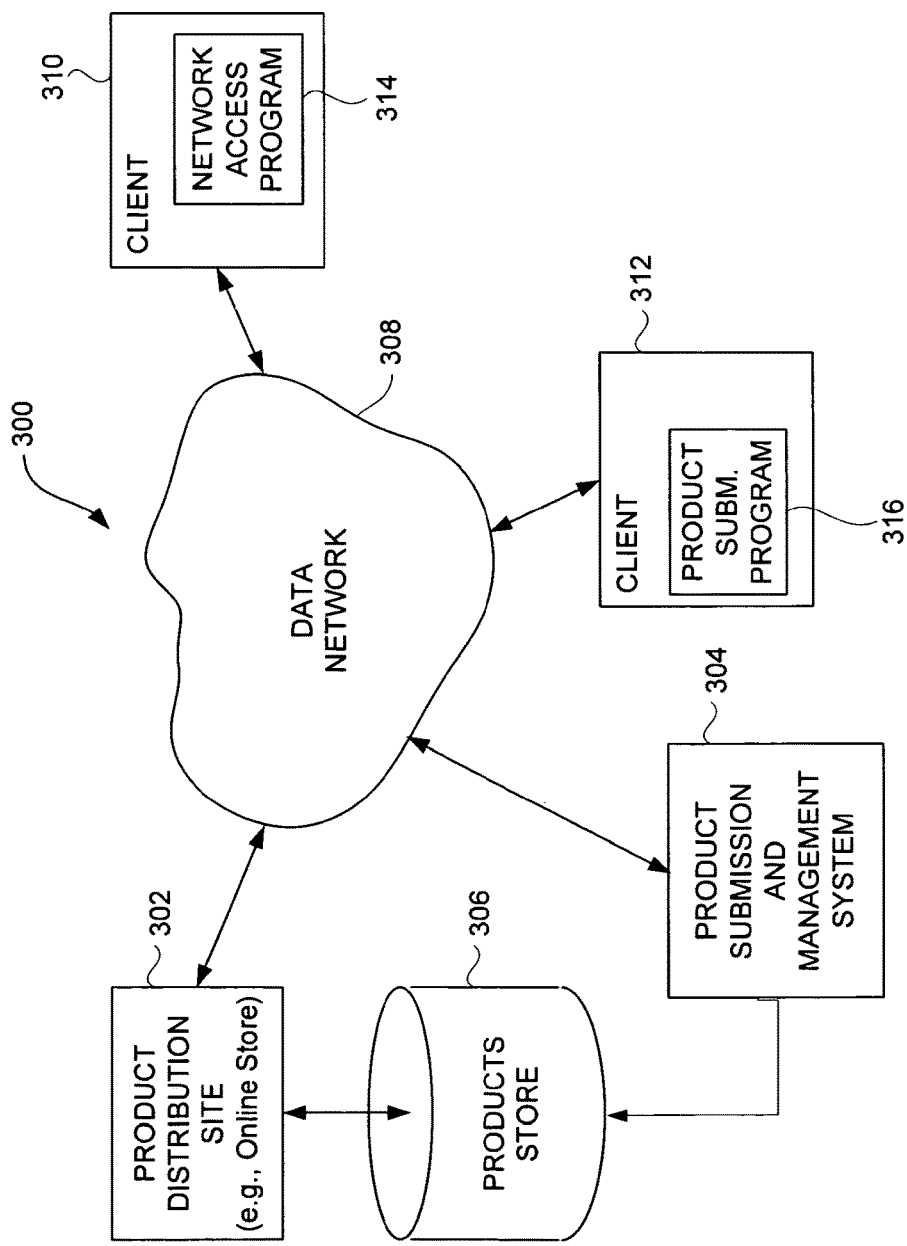
FIG. 3 is a block diagram of a product submission and distribution system according to one embodiment of the invention.

FIG. 3 is a block diagram of a product submission and distribution system 300 according to one embodiment of the invention. The product submission and distribution system 300 includes a product distribution site 302. The product distribution site 302 provides an online access point for distribution of various digital products. For example, the product distribution site 302 can also be referred to as an online product hosting site or an online store.

A product submission and management system 304 operates to receive submissions of digital products from various digital product submitters. The product submission and management system 304 can process submission of digital products and authorize distribution of approved digital products. The digital products can be stored in a products store 306. In one embodiment, the products store 306 includes a mass data store and one or more databases. The products store 306 provides mass storage of the numerous digital products that are available for distribution (e.g., purchase or rental). For example, digital products that have been purchased can be accessed from the products store 306 over a data network 308 by way of the product distribution site 302. Also, purchases made by users can be maintained as purchase history data by the product submission and distribution system 300. For example, the purchase history data can be stored in a database or file at any of a variety of locations, such as the product submission and management system 304, the production distribution site 302 or the products store 306. In one embodiment, the digital products are computer program products (e.g., computer software programs). Examples of computer program products are: applications (or application programs), animations, or presentations.

The product submission and distribution system 300 also includes a first client 310 and a second client 312. Typically, the product submission and distribution system 300 would include a plurality of different clients 310, 312. The first client 310 includes a network access program 314. The second client 312 includes a product submission program 316. Some clients can also include both the network access program 314 and the product submission program 316. The network access program 314 is an application program (e.g., software program) that operates on the first client 310, which is a computing device. One example of a suitable network access program is a network browser (e.g., Microsoft Explorer or Safari). Another example of a suitable network access program is iTunes™ offered by Apple Inc. The first client 310 is coupled to the product distribution site 302 through the data network 308. Hence, any of the first clients 310 can interact with the product distribution site 302 to review, purchase and/or manage digital products.

The product submission program 316 is also an application program (e.g., software application) that operates on the second client 312, which is a computing device. The product submission program 316 is used to submit digital products to the product submission and management system 304 for eventual distribution by the media distribution site 302. Although the network access program 314 and the product submission program 316 are shown in FIG. 3 as separate programs, it should be understood that such programs can be integrated into a single program or reside on the same client machine.

In the product submission and distribution system 300 shown in FIG. 3, the digital products are submitted to the product submission and management system 304 by way of the product submission program 316. The digital products that have been submitted (e.g., via the second client 312) are processed and then stored in the products store 306. Thereafter, the stored digital products are available to be purchased from the product distribution site 302. Upon purchasing a particular digital product, the product distribution site 302 permits the digital data for the particular digital product to be retrieved from the products store 306 and then delivered (e.g., downloaded) from the product distribution site 302 to the requesting client 310 through the data network 308. In this regard, the product distribution site 302 or some other delivery server (not shown) obtains the digital data corresponding to the particular digital product from the products store 306 and downloads such digital data through the data network 308 to the client 310. The downloaded digital data can then be stored on the client 310. In one embodiment, the downloaded digital data is encrypted as received at the client 310 but is decrypted and then perhaps re-encrypted before persistently stored on the client 310. Thereafter, the client 310 can utilize (e.g., execute) the digital data of the digital product at the client 310.

The product submission and distribution system 300 allows a user of the client 310 to utilize the network access program 314 to browse, search or sort through a plurality of digital products that can be purchased from the product distribution site 302. The network access program 314 may also allow the user to preview or demo some or all of a digital product. In the event that the user of the network access program 314 desires to purchase a particular digital product, the user (via the network access program 314) and the product distribution site 302 can engage in an online commerce transaction in which the user pays for access rights to the particular digital product. In one embodiment, a credit card associated with the user is credited for a purchase (or rental amount) of the particular digital product.

The submission and purchase of the digital products can be achieved over the data network 308. In other words, the submission and purchase of the digital products can be achieved online. The purchase of media items online can also be referred to as electronic commerce (e-commerce). In one embodiment, the data network 308 can make use of at least a portion of the Internet. The clients 310, 312 can vary with application but generally are computing devices that have memory storage. Often, the clients 310, 312 are personal computers or other computing devices that are capable of storing and presenting media to their users. In one embodiment, the connections through the data network 308 between the product distribution site 302 and the clients 310, 312 can be through secure connections, such as Secure Sockets Layer (SSL).

Although the product distribution site 302, the product submission and management system 304 and the products store 306 are shown in FIG. 3 as being separate components, it should be understood that any of these components can be combined into one or more apparatus. For example, the product submission and management system 304 can be incorporated into the product distribution site 302. As another example, the products store 306 can be incorporated into the product distribution site 302 or the product submission and management system 304.

Additional details on the product submission and management system 304 can be found in U.S. Provisional Patent Application No. 61/050,478, filed May 5, 2008, entitled "ELECTRONIC SUBMISSION AND MANAGEMENT OF DIGITAL PRODUCTS FOR NETWORK-BASED DISTRIBUTION", which is hereby incorporated herein by reference.

Figure 4:
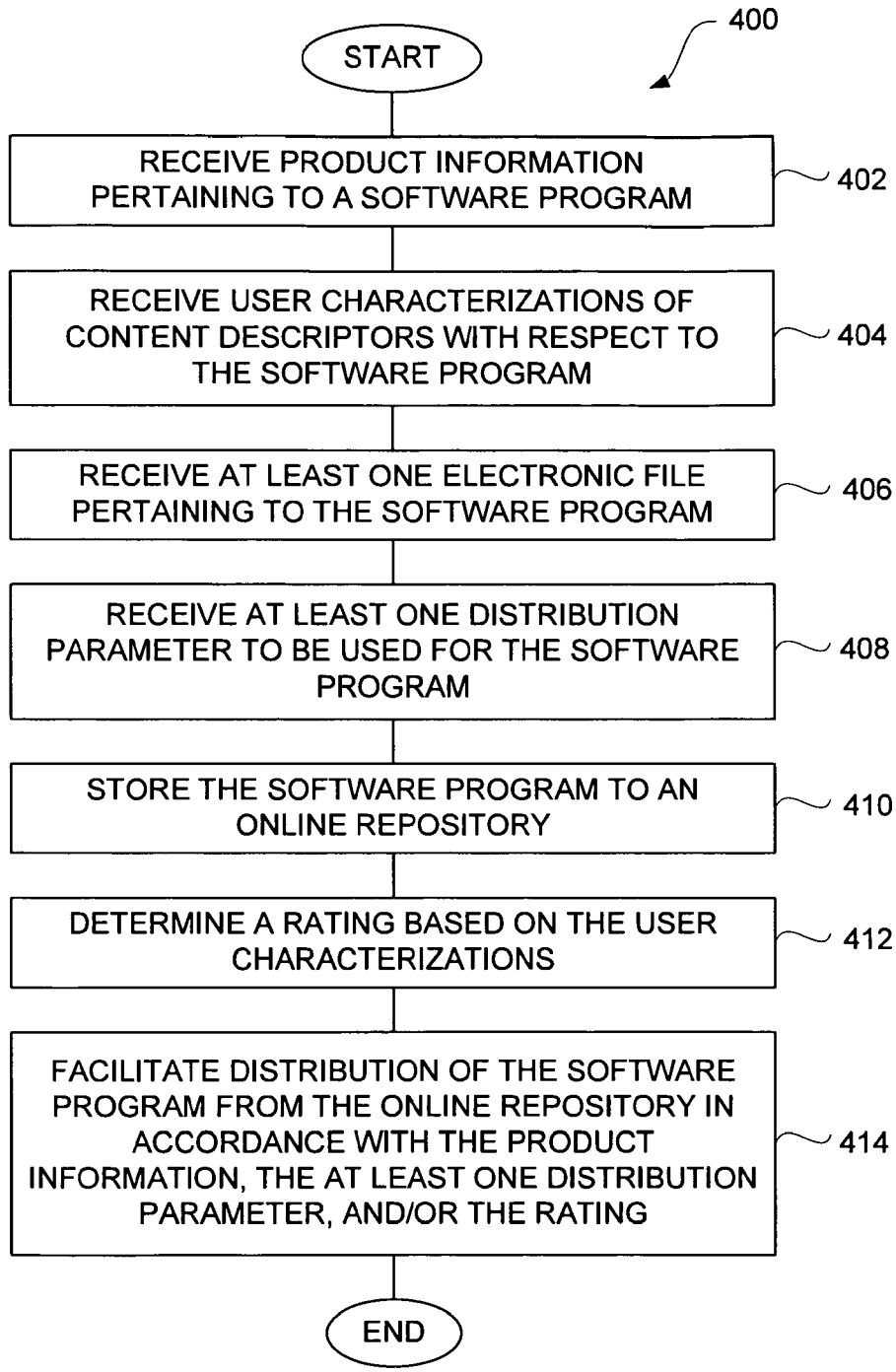
FIG. 4 is a software program submission process according to one embodiment of the invention.

FIG. 4 is a software program submission process 400 according to one embodiment of the invention. The software program submission process 400 can, for example, be performed by the product submission and management system 304 illustrated in FIG. 3.

The software program submission process 400 can receive 402 product information pertaining to a software program. Further, user characterizations of content descriptors with respect to the software program can be received 404. Also, at least one electronic file pertaining to the software program can be received 406. Typically, the electronic file contains the executable program code of the software program. Further, at least one distribution parameter to be used for the software program can be received 408. A distribution parameter is a parameter that can be utilized to control or influence the manner in which the software program is able to be distributed. One example of a distribution parameter is a pricing parameter. As an example, a pricing parameter can specify a price or a price tier to be associated with the software program. Other distribution parameters can pertain to digital storefronts from which the digital product is to be distributed from (i.e., geographic availability). Still further, distribution parameters could also pertain to preview eligibility, license categories (types), etc.

The software program submission process 400 can also store 410 the software program to an online repository. For example, the online repository can store software programs that are made available for distribution through an online store. The software program submission process 400 further operates to determine 412 a rating for the software program based on at least the user characterizations. Still further, these software program submission process 400 can facilitate 414 distribution of the software program from the online repository. More particularly, the distribution of the software program from the online repository can be performed in accordance with the product information, the at least one distribution parameter, and/or the rating. Following the block 414, the software program submission process 400 can end.

Figure 5:
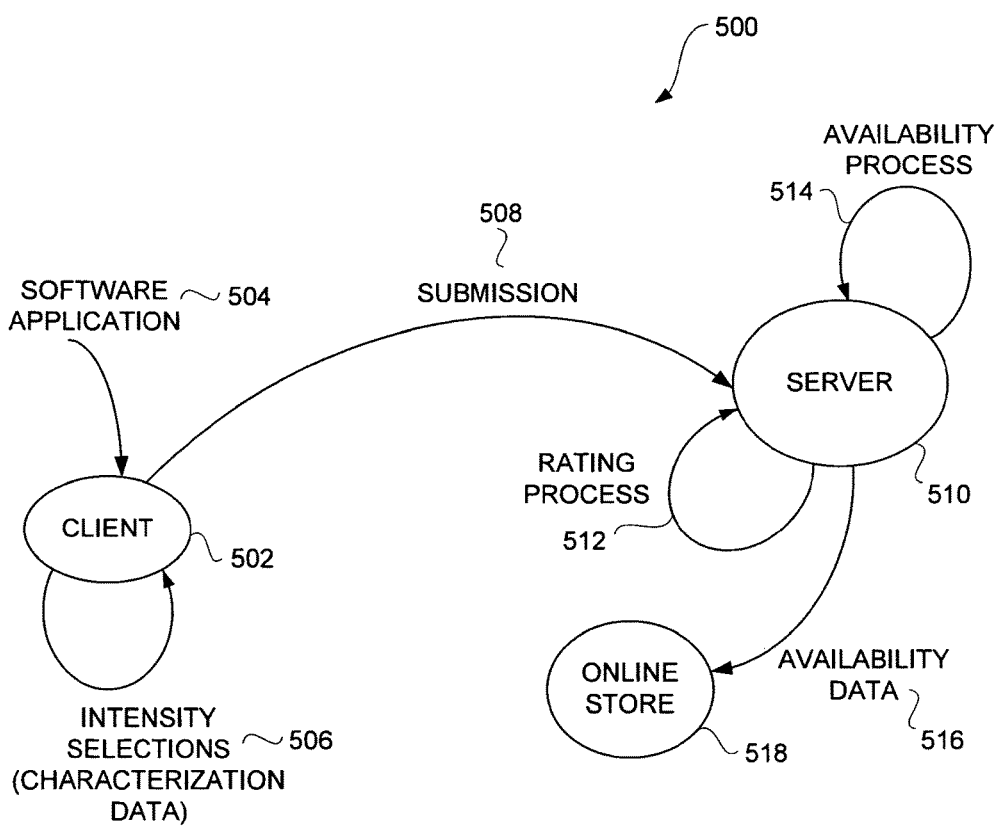
FIG. 5 illustrates an exemplary state diagram according to one embodiment of the invention.

FIG. 5 illustrates an exemplary state diagram 500 according to one embodiment of the invention. In the state diagram 500 a client 502 receives a software application 504. Here, the software application 504 is being identified or provided to the client 502. Through user interaction, intensity selections 506 can be associated with the software application. The intensity selections 506 can pertain to characterization data. Then, the software application 504 together with the intensity selections 506 can be packaged together as a submission 508 to a server 510. The server 510 can implement a rating process 512 to determine a rating for the software application. In one embodiment, the rating process 512 makes use of the intensity selections 506 that were submitted to the server 510. The server 510 can also implement an availability process 514. The availability process 514 can determine which of one or more geographic regions the software application is available for distribution. In one embodiment, the rating associated with the software application can influence where the software application is available for distribution. An online store 518 renders the software application 504 available for online distribution. The server 510 can provide availability data 516 to the online store 518. The availability data 516 is data produced by the availability process 514 and informs the online store as to which of the one or more geographic areas that the software application 504 is available for online distribution.

Figure 6:
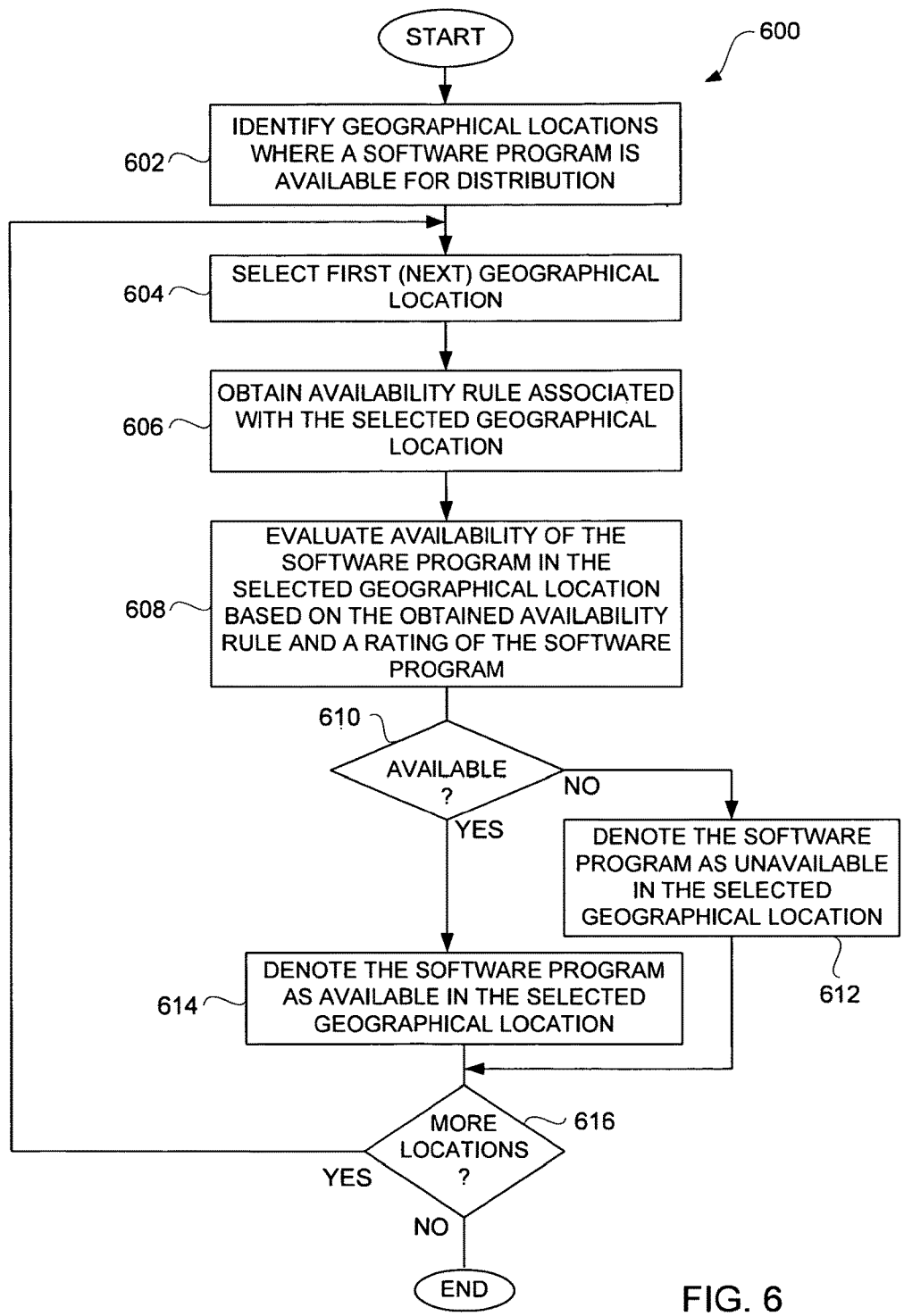
FIG. 6 is a flow diagram of software program availability process according to one embodiment of the invention.

FIG. 6 is a flow diagram of software program availability process 600 according to one embodiment of the invention. The software program availability process 600 can, for example, be performed by a server device.

The software program availability process 600 can identify 602 geographical locations where a software program is available for distribution. Then, a first geographical location can be selected 604 for processing. An availability rule associated with the selected geographical location can be obtained 606. The availability of the software program in the selected geographical location can then be evaluated 608 based on the obtained availability rule and a rating of the software program. For example, based on a rating, an available rule can render a software program unavailable.

Next, a decision 610 determines whether the software program is available in the selected geographical location. When the decision 610 determines that the software program is not available in the selected geographical location, the software program can be denoted 612 as is being unavailable in the selected geographical location. Alternatively, when the decision 610 determines that the software program is available in the selected geographical location, the software program can be denoted 614 as available in the selected geographical location.

Next, following either the block 612 or the block 614, a decision 616 can determine whether there are more geographical locations to be processed. When the decision 616 determines that there are more geographical locations to be processed, the software program availability process 600 can return to repeat the block 604 so that a next geographical location can be selected 604 and further processing at blocks 604 through 616 can be performed. Alternatively, when the decision 616 determines that there are no more geographical locations to be processed, the software program availability process 600 can end.

Moreover, ratings systems or sensitivities can vary geographically, such as in different countries, A game rating for a game to be distributed in the United Kingdom can receive a different (e.g., higher) rating than if the game were rated in the United Kingdom than in the United States. In one embodiment, a rating rule can be used to impose a higher rating for the United Kingdom.

Rating can be presented to users of an online store when browsing or review information on software programs available for purchase. The rating provide users with an indication of suitability of the software programs to different age groups. Ratings can also be use by parental control feature of a network access program (e.g., iTunes™) to limit accessibility to software programs based on level of rating.

As noted above, rating for software programs can be based on user characterizations. An online store can also permit other users to inform the online store of software programs that may have an inaccurate rating. As appropriate, software programs that are noted (e.g.; flagged) as being inaccurately rated can be remove from the online store, personally reviewed, and/or cause developers/publishers to receive a warning. Hence, other users can provide monitor for the ratings of the software programs made available for distribution via an online store.

This application also references and/or incorporates: (1) U.S. patent application Ser. No. 10/687,534, filed Oct. 15, 2003, and entitled "METHOD AND SYSTEM FOR SUBMITTING MEDIA FOR NETWORK-BASED PURCHASE AND DISTRIBUTION", which is hereby incorporated herein by reference; (2) U.S. patent application Ser. No. 11/712,303, filed Feb. 27, 2007, and entitled "PROCESSING OF METADATA CONTENT AND MEDIA CONTENT RECEIVED BY A MEDIA DISTRIBUTION SYSTEM", which is hereby incorporated herein by reference; (3) U.S. patent application Ser. No. 11/609,815, filed Dec. 12, 2006, and entitled "TECHNIQUES AND SYSTEMS FOR ELECTRONIC SUBMISSION OF MEDIA FOR NETWORK-BASED DISTRIBUTION", which is hereby incorporated herein by reference; (4) U.S. patent application Ser. No. 11/622,923, filed Jan. 12, 2007, and entitled "COMPUTERIZED MANAGEMENT OF MEDIA DISTRIBUTION AGREEMENTS", which is hereby incorporated herein by reference; and (5) U.S. Provisional Patent Application No. 61/050,478, filed May 5, 2008, entitled "ELECTRONIC SUBMISSION AND MANAGEMENT OF DIGITAL PRODUCTS FOR NETWORK-BASED DISTRIBUTION", which is hereby incorporated herein by reference.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of certain embodiments of the invention is that ratings for software programs can be obtained in a simplified, cost-effective manner. Another advantage of certain embodiments of the invention is that ratings can be centrally determined for different geographical regions. Another advantage of certain embodiments of the invention is that previously determined ratings can be changed in a computer implemented manner if rating criteria used to determine the ratings changes. Still another advantage of certain embodiments of the invention is that rating rules can be used to deterministically set ratings. Yet still another advantage of certain embodiments of the invention is that once a rating is associated with a software program, the rating can be used to influence availability of the software program from an online distribution system.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for determining a rating for a digital product, the method comprising:
    receiving submission of digital products, through an online access point, over a data network;
    causing storage of the received digital products;
    displaying, on a display associated with a computing device, a user interface that comprises:
        multiple content descriptors for a first digital product of the received digital products; and
        options coinciding with the multiple content descriptors for user selection that describe a frequency and an intensity of the content in the first digital product by non-numerical selections;
    receiving selections of user characterizations of the frequency and the intensity for each of the multiple content descriptors;
    calculating a rating level for each of the multiple content descriptors using the user characterizations;
    determining a highest rating level for the first digital product by comparing all of the rating levels of all of the multiple content descriptors;
    disallowing distribution of the first digital product over the data network to a first geographic region of a plurality of geographic regions based on the determined highest rating level for the first digital product; and
    authorizing distribution of the first digital product over the data network to a second geographic region of the plurality of geographic regions based on the determined highest rating level for the first digital product.

2. The computer-implemented method of claim 1, wherein the first digital product is assigned different rating levels in different geographic regions based on a geographic rule pertaining to specific geographic regions, the geographic rule assigning a higher rating than the determined highest rating level for the first digital product in a third geographic region of the plurality of geographic regions relative to the determined highest rating level assigned for the first digital product in at least one other geographic region.

3. The computer-implemented method of claim 1, wherein the user interface displays a table, each row of the table labeled with one of the multiple content descriptors, and each column of the table labeled with one of the options that describe the frequency and the intensity of the coinciding content.

4. The computer-implemented method of claim 1, wherein at least one of the multiple content descriptors is selected from a group comprising: cartoon violence, fantasy violence, and realistic violence.

5. The computer-implemented method of claim 1, wherein at least one of the multiple content descriptors is sexual conduct or nudity.

6. The computer-implemented method of claim 1, wherein at least one of the multiple content descriptors is profanity or crude humor.

7. The computer-implemented method of claim 1, wherein at least one of the multiple content descriptors is alcohol, tobacco or drug use references.

8. The computer-implemented method of claim 1, wherein at least one of the multiple content descriptors is mature or suggestive themes.

9. The computer-implemented method of claim 1, further comprising:
    receiving at least one distribution parameter for use in controlling a manner in which the first digital product is distributed, wherein the at least one distribution parameter includes information selected from a group comprising: pricing information, digital storefront availability information, geographic availability information, preview eligibility, and license category information; and
    distributing the first digital product according to the received at least one distribution parameter.

10. The computer-implemented method of claim 1, wherein at least one of the multiple content descriptors is horror or fear themes.

11. The computer-implemented method of claim 1, wherein at least one of the multiple content descriptors is prolonged graphic or sadistic realistic violence.

12. The computer-implemented method of claim 1, wherein at least one of the multiple content descriptors is graphical sexual content and nudity.

13. The computer-implemented method of claim 1, wherein the rating level is an age group rating.

14. A non-transitory computer readable medium including at least computer program code, that when executed by one or more processors, performs for a method of determining a rating for a digital product, the method comprising:
    receiving submission of digital products, through an online access point, over a data network;
    causing storage of the received digital products;
    displaying, on a display associated with a computing device, a user interface that comprises:
        multiple content descriptors for a first digital product of the received digital products; and
        options coinciding with the multiple content descriptors for user selection that describe a frequency and an intensity of content in the first digital product by non-numerical selections;
    receiving selections of user characterizations of the frequency and the intensity for each of the multiple content descriptors;
    calculating a rating level for each of the multiple content descriptors using the user characterizations;
    determining a highest rating level for the first digital product by comparing all of the rating levels of all of the multiple content descriptors; and
    disallowing distribution of the first digital product over the data network to a first geographic region of a plurality of geographic regions based on the determined highest rating level for the first digital product; and
    authorizing distribution of the first digital product over the data network to a second geographic region of the plurality of geographic regions based on the determined highest rating level for the first digital product.

15. The non-transitory computer readable medium of claim 14, wherein the first digital product is assigned different rating levels in different geographic regions based on a geographic rule pertaining to specific geographic regions, the geographic rule assigning a higher rating than the determined highest rating level for the first digital product in a third geographic area of the plurality of geographic regions relative to the determined highest rating level assigned for the first digital product in at least one other geographic region.

16. The non-transitory computer readable medium of claim 14, wherein the user interface displays a table, each row of the table labeled with one of the multiple content descriptors, and each column of the table labeled with one of the options that describe the frequency and the intensity of the coinciding content.

17. The non-transitory computer readable medium of claim 14, wherein at least one of the multiple content descriptors is selected from a group comprising: cartoon violence, fantasy violence, and realistic violence.

18. The non-transitory computer readable medium of claim 14, wherein at least one of the multiple content descriptors is sexual conduct or nudity.

19. The non-transitory computer readable medium of claim 14, wherein at least one of the multiple content descriptors is profanity or crude humor.

20. The non-transitory computer readable medium of claim 14, wherein at least one of the multiple content descriptors is alcohol, tobacco or drug use references.

21. The non-transitory computer readable medium of claim 14, wherein at least one of the multiple content descriptors is mature or suggestive themes.

22. The non-transitory computer readable medium of claim 14, wherein the method further comprises:

receiving at least one distribution parameter for use in controlling a manner in which the first digital product is distributed, wherein the at least one distribution parameter includes information selected from a group comprising: pricing information, digital storefront availability information, geographic availability information, preview eligibility, and license category information; and distributing the first digital product according to the received at least one distribution parameter.

23. The non-transitory computer readable medium of claim 14, wherein at least one of the multiple content descriptors is horror or fear themes.

24. The non-transitory computer readable medium of claim 14, wherein at least one of the multiple content descriptors is prolonged graphic or sadistic realistic violence.

25. The non-transitory computer readable medium of claim 14, wherein at least one of the multiple content descriptors is graphical sexual content and nudity.

26. The non-transitory computer readable medium of claim 14, wherein the rating level is an age group rating.

* * * * *